United States Patent
Chen

(10) Patent No.: US 7,929,389 B2
(45) Date of Patent: Apr. 19, 2011

(54) OPTIMUM POWER CALIBRATION METHOD AND OPTICAL DISK DRIVE

(75) Inventor: Hung-Chang Chen, Shindian (TW)

(73) Assignee: Via Technologies, Inc., Taipei (TW)

( * ) Notice: Subject to any disclaimer, the term of this patent is extended or adjusted under 35 U.S.C. 154(b) by 897 days.

(21) Appl. No.: 11/201,135

(22) Filed: Aug. 11, 2005

(65) Prior Publication Data

US 2006/0262683 A1    Nov. 23, 2006

(30) Foreign Application Priority Data

May 17, 2005 (TW) ............................... 94115997 A

(51) Int. Cl.
*G11B 20/10* (2006.01)
(52) U.S. Cl. .................................................. 369/47.53
(58) Field of Classification Search ............... 369/47.53
See application file for complete search history.

(56) References Cited

U.S. PATENT DOCUMENTS

| | | | |
|---|---|---|---|
| 6,480,448 B1* | 11/2002 | Kawano et al. | 369/47.5 |
| 6,665,249 B2* | 12/2003 | Liew | 369/59.1 |
| 7,035,184 B2* | 4/2006 | Takeda | 369/47.39 |
| 7,304,929 B2* | 12/2007 | Ninomiya | 369/47.53 |
| 2002/0085462 A1* | 7/2002 | Spruit | 369/47.53 |
| 2004/0125720 A1* | 7/2004 | Ando et al. | 369/47.53 |
| 2004/0264329 A1* | 12/2004 | Lee | 369/47.53 |
| 2005/0030861 A1* | 2/2005 | Matsui et al. | 369/47.53 |
| 2005/0068869 A1* | 3/2005 | Sugiyama et al. | 369/47.32 |

FOREIGN PATENT DOCUMENTS

CN    1397067A A    2/2003

* cited by examiner

*Primary Examiner* — Wayne R Young
*Assistant Examiner* — Aneeta Yodichkas
(74) *Attorney, Agent, or Firm* — Birch, Stewart, Kolasch & Birch, LLP

(57) ABSTRACT

An optimum power calibration method is provided and is implemented for writing a rewritable optical storage medium including a power calibration area. The method includes the steps of determining whether the power calibration area is recorded with data, erasing the entire power calibration area when the power calibration area is not recorded, and executing an optimum power calibration procedure. In addition, the optimum power calibration method is applied to a rewritable optical disk drive.

6 Claims, 4 Drawing Sheets

OPTIMUM POWER CALIBRATION METHOD AND OPTICAL DISK DRIVE

BACKGROUND OF THE INVENTION

1. Field of Invention

The present invention relates to an optimum power calibration method, and more particularly to an optimum power calibration method applied to a rewritable optical disk drive.

2. Related Art

For rewritable optical disks, such as CD-RW, DVD-RW and DVD+RW, one first performs an optimum power calibration (OPC) procedure in a power calibration area of the rewritable optical disk to determine the writing power of an optical pick-up head for writing data to the optical disk.

FIG. 1 shows the relationship between the number of times of writing a conventional rewritable optical disk on the horizontal axis, and the corresponding rate of data reading failure frequency on the vertical axis. When an empty rewritable optical disk is written with data several times, the corresponding rate of data reading failure frequency of the written data may be different. In particular, it is more likely to cause reading failure at the first few times of writing the rewritable optical disk. For a CD-RW, one can observe its C1 and C2 values to evaluate the reading failure frequency. For a DVD-RW, one can observe its PI and PO values to evaluate the rate of data reading failure frequency.

However, the higher the rate of the reading failure frequency is, the more difficult it is for the optical disk drive to correctly read the written data on the optical disk. The worst case is that the written data recorded on the rewritable optical disk may have been lost already.

One of possible reasons for the reading failure of written data on the rewritable optical disk may be that the optimum power calibration procedure before the data writing is not optimized. In that case, the written data are not correctly recorded on the rewritable optical disk and, therefore, it is likely to encounter failure when reading the written data.

It is thus imperative to provide an optimum power calibration method and an optical disk drive. It is expected to find an appropriate writing power by improving the current optimum power calibration procedure. It is also expected to improve the reading failure during the first few times of data writing.

SUMMARY OF THE INVENTION

In view of the foregoing, the present invention provides an optimum power calibration method and an optical disk drive for improving the result of the optimum power calibration procedure.

To achieve the above, an optimum power calibration method according to the present invention is implemented for writing a rewritable optical storage medium including a power calibration area. The method includes the steps of determining whether the power calibration area is recorded with data, erasing the entire power calibration area when the power calibration area is not recorded, and executing an optimum power calibration procedure.

To achieve the above, an optical disk drive according to the present invention is implemented for writing a rewritable optical storage medium including a power calibration area. The optical disk drive includes a determining module, an erasing module and an executing module. The modules may be implemented in the form of software such as program codes that are executed by a digital signal processor (DSP) or a microprocessor. The determining module is used to determine whether the power calibration area is recorded with data, and generate a determining result. The erasing module is used to erase the entire power calibration area when the determining result indicates that the power calibration area is not recorded. The executing module is used to activate an optimum power calibration procedure.

As mentioned above, an optimum power calibration method and an optical disk drive according to the present invention erase the entire power calibration area when the power calibration area is not recorded. Therefore, the result of the optimum power calibration procedure can be improved to reduce reading failure of the written data.

BRIEF DESCRIPTION OF THE DRAWINGS

The present invention will become more fully understood from the detailed description given herein below illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
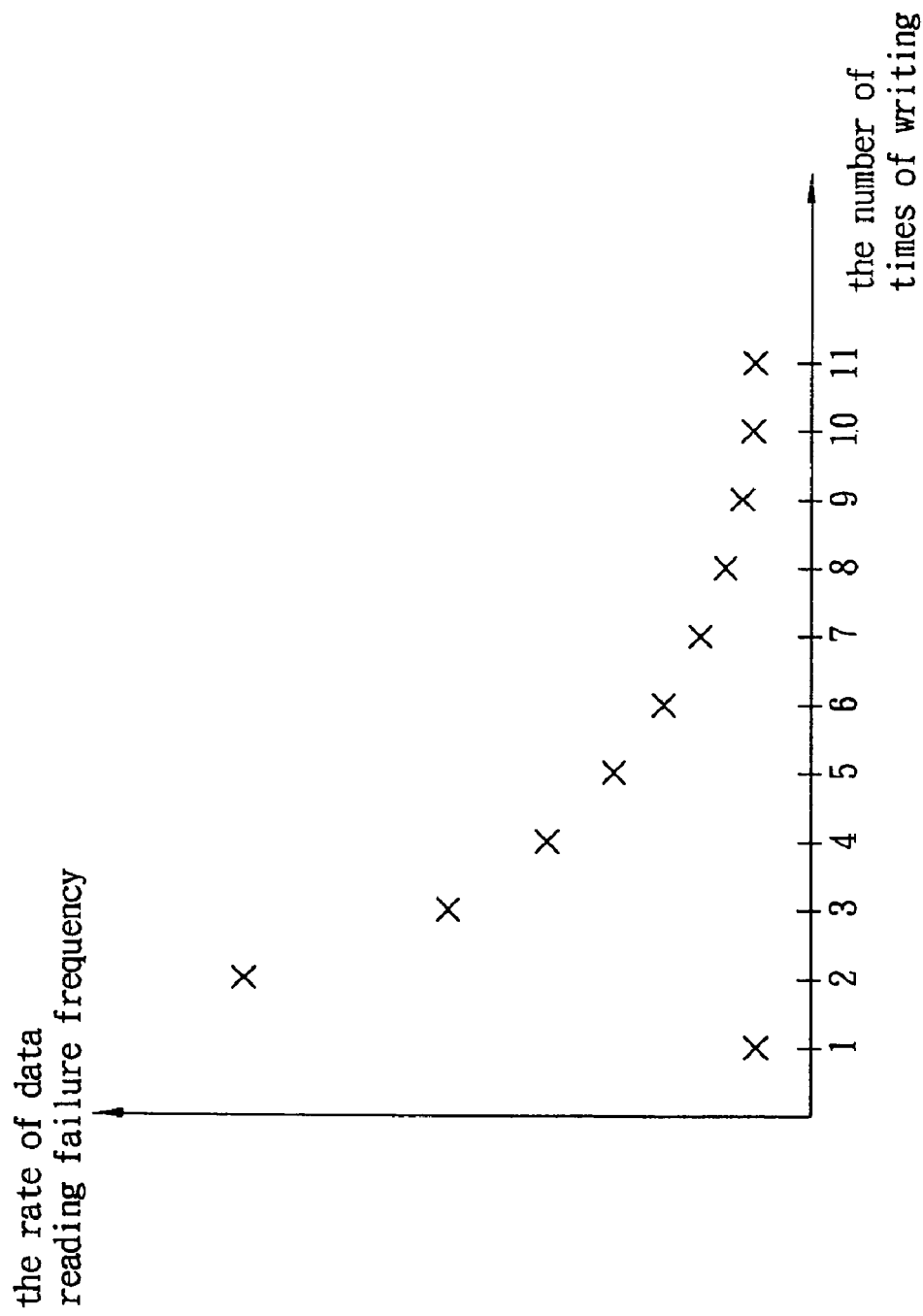
FIG. 1 shows the relationship between the number of times of writing a conventional rewritable optical disk and the corresponding rate of data reading failure frequency.
Figure 2:
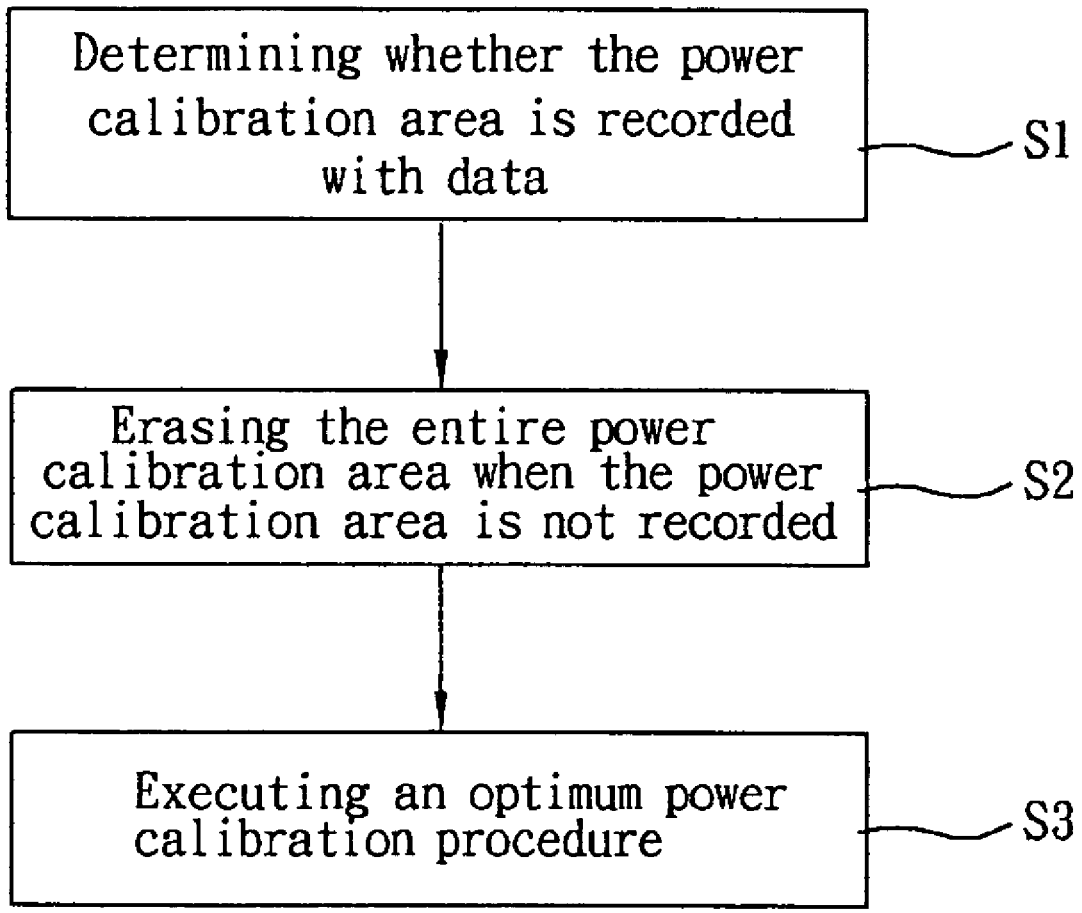
FIG. 2 shows a flowchart of an optimum power calibration method according to the present invention.

As shown in FIG. 2, an optimum power calibration method according to the present invention is implemented for writing a rewritable optical storage medium including a power calibration area. The method includes steps from S1 to S3. In step S1, the power calibration area of a loaded optical disk is determined whether being recorded with data. Then, in step S2, the entire power calibration area is erased when the power calibration area is not recorded. Finally, an optimum power calibration procedure is executed in step S3. In this embodiment, the optimum power calibration procedure meets the issued specification for optical storage medium. The optical storage medium is a rewritable compact disk (CD-RW) or a rewritable digital versatile disk (DVD+RW or DVD-RW).

Figure 3:
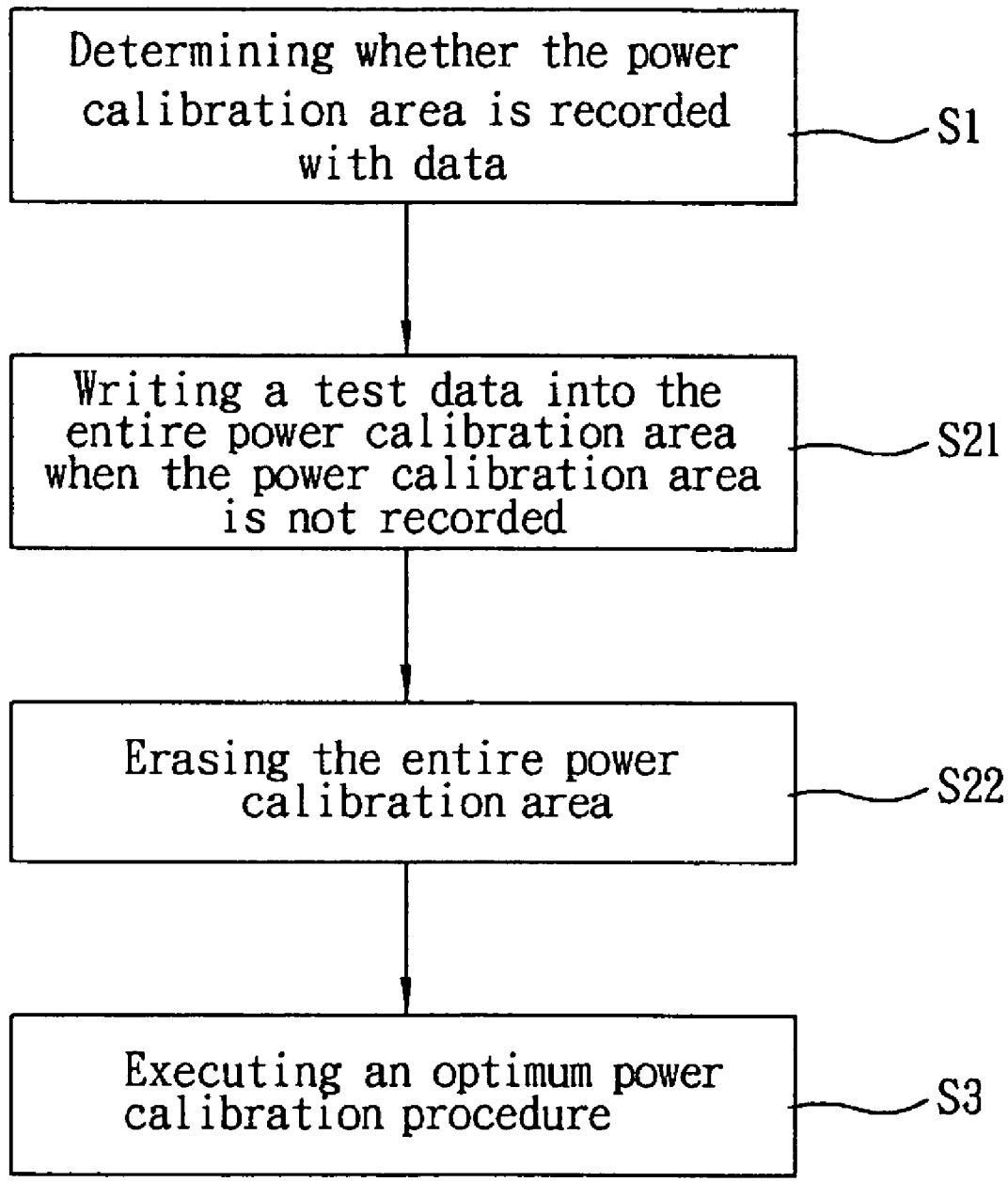
FIG. 3 shows another flowchart of an optimum power calibration method according to the present invention.

As shown in FIG. 3, the disclosed step S2 can be substituted by using steps S21 and S22. As the same as that in FIG. 2, the power calibration area is first determined whether being recorded with data. Then, in step S21, a test data is written into the entire power calibration area when the power calibration area is not recorded. The test data can be random digital binary data. Then, the entire power calibration area recorded with the random data is erased in step S22. Finally, an optimum power calibration procedure is executed in step S3.

Figure 4:
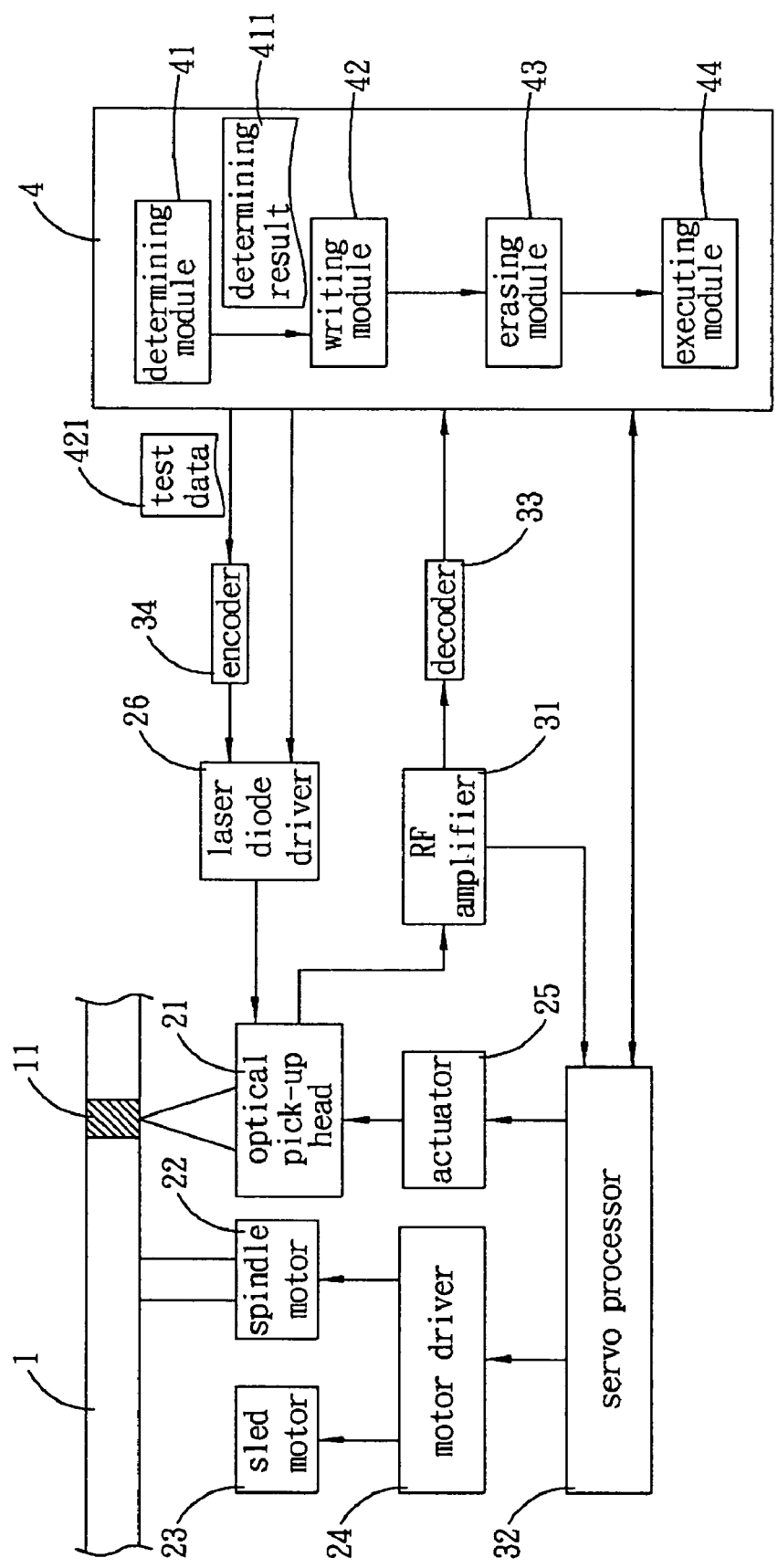
FIG. 4 shows a block diagram of an optical disk drive according to the present invention.

As shown in FIG. 4, an optical disk drive according to the present invention includes an optical pick-up head 21, a spindle motor 22, a sled motor 23, a motor driver 24, an actuator 25, a laser diode driver 26, an RF amplifier 31, a servo processor 32, a decoder 33, an encoder 34 and a controller 4.

The data picked up by the optical pick-up head 21 from an optical disk 1 are amplified by the RF amplifier 31. The amplified data are processed by the servo processor 32 to control the motor driver 24, which drives the spindle motor 22 and the sled motor 23 and then controls the actuator 25 to move the optical pick-up head 21. The optical pick-up head 21 is thus able to move to a predetermined position so as to correctly read data from the optical disk 1 or to write data into the optical disk 1.

In this embodiment, the controller 4 includes a determining module 41, a writing module 42, an erasing module 43 and an executing module 44. The determining module 41, the writing module 42, the erasing module 43 and the executing module 44 may be software such as program codes executable by the controller 4. The controller 4 may be a digital signal processor (DSP) or a microprocessor of the optical disk drive. The controller 4 accesses these modules and performs those functions defined therein.

After the optical pick-up head 21 reads a power calibration area 11 of the optical disk 1, the data are amplified by the RF amplifier 31 and then decoded by the decoder 33. Afterwards, the decoded data are sent to the determining module 41. The controller 4 accesses the determining module 41 to perform determining whether the power calibration area 11 of the optical disk 1 is recorded with data, and then a determining result 411 is generated.

When the determining result 411 indicates that the power calibration area 11 is not recorded, the servo processor 32 moves the optical pick-up head 21 to the position of the power calibration area 11. The controller 4 accesses the writing module 42 to perform generating a test data 421 and transmitting the test data 421 to the encoder 34. The laser diode driver 26 is controlled to drive the optical pick-up head 21 in order to write the encoded test data 421 to the entire power calibration area 11, and the test data 421 may be generated randomly.

After the entire power calibration area 11 is recorded with the encoded test data 421, the controller 4 accesses the erasing module 43 to perform controlling the laser diode driver 26 to drive the optical pick-up head 21 for erasing the entire power calibration area 11. In another embodiment, when the determining result 411 indicates that the power calibration area 11 is not recorded, the controller 4 accesses the erasing module 43 to perform directly erasing the entire power calibration area 11.

After the entire power calibration area 11 is erased, the controller 4 accesses the executing module 44 to perform executing an optimum power calibration procedure to determine the writing power of the optical pick-up head 21. The optimum power calibration procedure is designed to meet the issued specification for the optical disk 1, which can be a CD-RW, a DVD+RW or a DVD-RW.

In this embodiment, the decoder 33, the encoder 34 and the controller 4 may be integrated in a chip. The RF amplifier 31 and the servo processor 32 may be integrated in a chip. Alternatively, at least two of the RF amplifier 31, the servo processor 32, the decoder 33, the encoder 34, and the controller 4 are integrated in the same chip.

In summary, an optimum power calibration method and an optical disk drive according to the present invention erase the entire power calibration area when the power calibration area is not recorded. Therefore, the result of the optimum power calibration procedure can be improved to reduce reading failure of the written data.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the the scope of the present invention.

What is claimed is:

1. An optimum power calibration (OPC) method implemented for writing a rewritable optical storage medium including a power calibration area, the method comprising:
   a determining step, determining whether the power calibration area is recorded with data;
   an erasing step, erasing the entire power calibration area when the entire power calibration area is not recorded; and
   an OPC step, executing an optimum power calibration procedure to determine a writing power after the determining step and the erasing step,
   wherein the step of erasing the entire power calibration area when the entire power calibration area is not recorded comprising the steps of:
     writing a test data into the entire power calibration area when the entire power calibration area is not recorded; and
     erasing the entire power calibration area.

2. The optimum power calibration method according to claim 1, wherein the test data is random data.

3. An optical disk drive implemented for writing a rewritable optical storage medium including a power calibration area, the optical disk drive comprising:
   a determining module, which determines whether the power calibration area is recorded with data, and generates a determining result;
   an erasing module, which erases the entire power calibration area when the determining result indicates that the entire power calibration area is not recorded;
   an executing module, which executes an optimum power calibration procedure to determine a writing power after the erasing module erases the entire power calibration area; and
   a writing module, which writes a test data into the entire power calibration area when the entire power calibration area is not recorded, then the erasing module erases the entire power calibration area.

4. The optical disk drive according to claim 3 wherein the test data is random data.

5. An optical disk drive implemented for writing a rewritable optical storage medium including a power calibration area, the optical disk drive comprising:
   means for determining whether the power calibration area is recorded with data, and generating a determining result;
   means for erasing the entire power calibration area when the determining result indicates that the entire power calibration area is not recorded;
   means for executing an optimum power calibration procedure to determine a writing power after the means for erasing erases the entire power calibration area; and
   means for writing a test data into the entire power calibration area when the entire power calibration area is not recorded, then erasing the entire power calibration area.

6. The optical disk drive according to claim 5 wherein the test data is random data.

* * * * *